(No Model.)
E. H. WILKIN.
WRIST PIN.
No. 549,949. Patented Nov. 19, 1895.
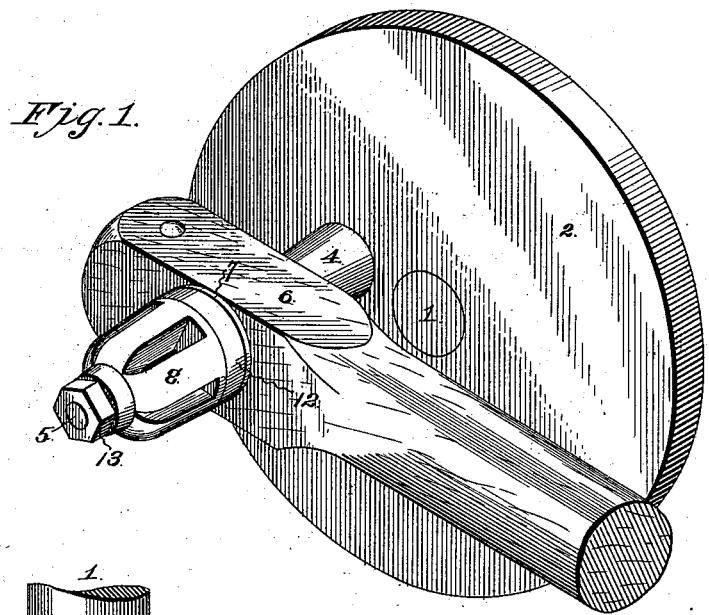
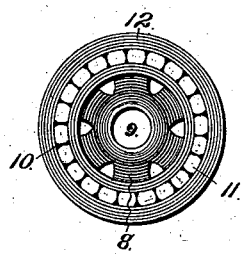
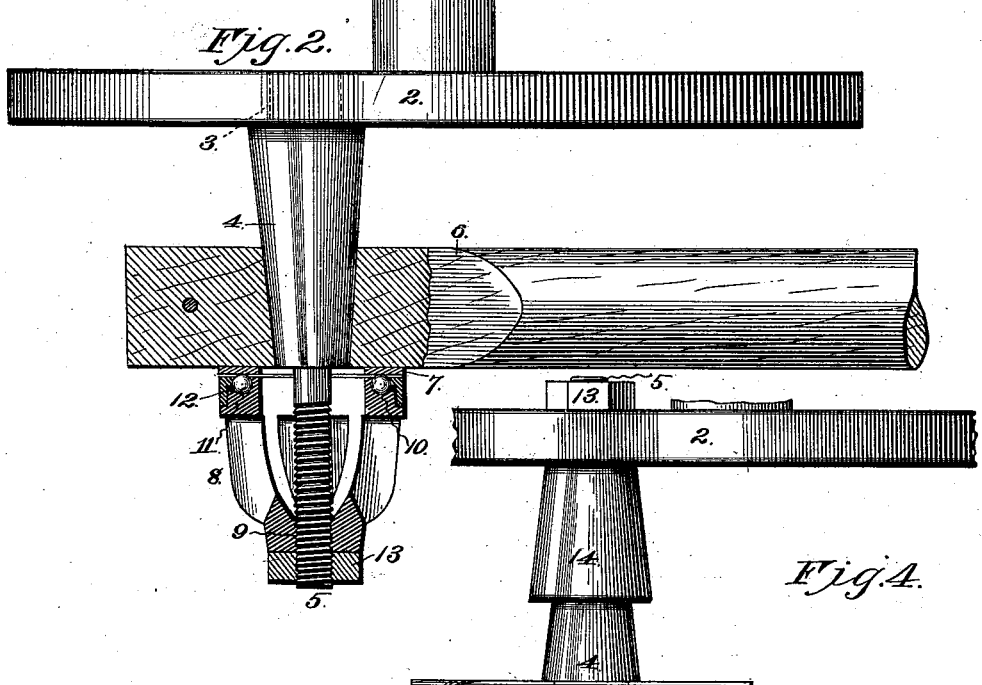
Witnesses:
Inventor
Ed H. Wilkin,
By Hickson & Hickson
attys.

UNITED STATES PATENT OFFICE.

ED H. WILKIN, OF SENECA, KANSAS.

WRIST-PIN.

SPECIFICATION forming part of Letters Patent No. 549,949, dated November 19, 1895.

Application filed February 18, 1895. Serial No. 538,825. (No model.)

*To all whom it may concern:*

Be it known that I, ED H. WILKIN, of Seneca, Nemaha county, Kansas, have invented certain new and useful Improvements in Wrist-Pins, of which the following is a full, clear, and exact description, reference being had to the accompanying drawings, forming a part hereof.

My invention relates to wrist-pins; and my object is to provide a wrist-pin which is simple, durable, and inexpensive of manufacture and may be easily and expeditiously adjusted to obviate lost motion between the pitman and the shaft. To this end it comprises, essentially, a stem having a conical portion upon which the pitman is pivotally mounted and a collar or sleeve which is movable upon the stem in order to adjust the pitman laterally, as is hereinafter more particularly explained.

The following description, considered in connection with the accompanying drawings, illustrates clearly the invention and the novel features thereof are pointed out in the appended claims.

Referring to said drawings, Figure 1 is a perspective view of a pitman and a disk carried by a shaft operatively connected by a wrist-pin constructed in accordance with my invention. Fig. 2 is a view of the same on an enlarged scale, partly in section and partly in elevation. Fig. 3 is a view of the ball-bearing end of the adjustable collar or sleeve. Fig. 4 is an elevation which illustrates a modified form of wrist-pin.

Similar numerals designate corresponding parts in all the figures.

1 designates a shaft to which motion is imparted to operate the pitman, and 2 designates the disk thereon, both of the usual or any preferred construction. The pin forming a part of my improved wrist-pin comprises a head 3, which is secured rigidly in any suitable or preferred manner to the disk at the proper distance from the center of its axis, a conical portion 4, which diminishes or tapers outwardly or away from said disk, and the threaded stem 5, which is preferably smaller than the contiguous or diminished end of the conical portion 4. The pitman 6 originally fits snugly upon the conical portion 4 of the said pin at its outer end, as shown most clearly in Fig. 2, so as to leave a suitable space between the contiguous faces of the said pitman and the disk 2, probably in a full-size machine an inch and a half, more or less, as circumstances may direct. This pitman, preferably, is of second-growth hickory, prepared in the usual manner for strength and durability; but it is to be understood that I do not confine myself to any particular material. An annular bearing plate or ring 7 is secured rigidly to the outer side of the pitman, concentrically of the opening therein and of the stem of said pin. A collar or sleeve 8, which may be of skeleton form, as shown, or of any other suitable form which possesses strength in the required degree, is provided at its outer end with the hub portion 9, which is internally threaded, preferably, and engages the threaded stem 5, and is provided in its opposite end, or that which opposes the bearing-ring 7, with an annular groove 10, and fitting rotatably in said groove in the ordinary manner are the balls or rollers 11, which are held in position by the ring 12, which is screwed or otherwise detachably secured upon the said collar or sleeve. When said collar or sleeve is secured properly in position, the balls are in contact with the opposing face of the ring 7. To hold the said collar or sleeve, whether internally-threaded or not, properly in position relative to said bearing-ring during the operation of the shaft, I employ one or more lock-nuts 13 of the construction shown, or of any other suitable or preferred construction.

It will be apparent that as the shaft 1 rotates with great rapidity, the pitman is caused to reciprocate longitudinally in the ordinary manner, the balls rolling freely upon the bearing-plate 7 during this operation. The pitman, at the same time, is held from lateral movement in one direction because of the gradually-increasing diameter of the conical portion 4, and in the other direction because of the collar or sleeve 8, which is rigidly held upon the stem 5 of the pin. Each time it is necessary to adjust the bearing between the pitman and the pin the collar or sleeve and the lock-nut may be rotatably operated upon the stem 5, so as to obviate any lost motion between the pitman and the shaft by forcing the pitman toward the disk 2 until it again fits snugly upon the conical portion 4 of said pin, if the opening in said pitman is worn larger in any appreciable degree. By using precaution in touching lightly said collar or sleeve each time it needs oiling, or at any other time desired, it is obvious that the pitman can always be kept snugly upon the conical portion of the pin and that this adjustment of the pitman may take place until it is nearly in contact with the face of the disk. The pitman may then be easily and cheaply replaced by another.

In Fig. 4 the pin comprising the head 3, the conical portion 4, and the stem 5, is carried by the pitman, and carried by the disk 2 in a conical shell 14. The conical portion 4 of the pin is fitted into said shell, and the threaded stem 5 projects through and beyond the disk 2 and is engaged by one or more nuts 13 at its projecting end. With this construction it is obvious that as the connection between the conical portions 4 and 14 becomes loose through wear the operation of the nut or nuts 13 in the proper direction will draw the pitman nearer to the disk, and therefore cause the said conical portions 4 and 14 to again fit snugly together, so that lost motion will be obviated. In this connection it is obvious that a ball-bearing of any suitable construction may be arranged between the nut 13 and the disk 2, as previously described with reference to the pitman. It is apparent that the connection shown in Fig. 4 in principle is the same as in Figs. 1 and 2, the position of the parts only being reversed. This wrist-pin connection is designed for use particularly with mowing-machines, where the wear and tear is great owing to the great rapidity of rotation of the shaft 1, which imparts motion through the pitman to the cutting mechanism.

If required, the pitman used in connection with my improved wrist-pin may also be provided with a metallic lining or with a detachable pitman-box, (not shown,) which, as it becomes worn, is not discarded. Instead, it is only necessary to adjust the pitman nearer to the disk in the manner hereinbefore explained.

It is to be understood that changes in the form, material, proportion, and arrangement of the parts herein shown and described may be made without departing from the essential spirit and scope of my invention.

Having thus described my invention, what I claim as new, and desire to secure by Letters Patent, is—

1. The combination with a shaft, a disk or arm mounted thereon, and a pin carried by said disk or arm, consisting of a conical portion and a threaded stem, of a pitman pivotally mounted upon said conical portion, a collar or nut adjustably mounted upon the stem, a ball-bearing interposed between said collar or sleeve and said pitman, and means to hold said ball-bearing properly against said pitman by preventing the back-rotation of said collar or sleeve, substantially as set forth.

2. A wrist-pin connection between a shaft and a pitman, comprising a pin eccentrically supported from said shaft, said pin having a conical portion pivotally engaged by a pitman, and a threaded stem, a collar or sleeve threaded and mounted upon said stem, balls carried thereby to provide an antifriction connection between said collar or sleeve and the pitman, a ring holding said balls in place, and a lock-nut upon said stem to prevent any back-rotation of said collar or sleeve, substantially as set forth.

In testimony whereof I affix my signature in the presence of two witnesses.

ED H. WILKIN.

Witnesses:
FRANK MORRIS,
J. E. STILLWELL.